United States Patent [19]
Harder et al.

[11] Patent Number: 6,122,297
[45] Date of Patent: Sep. 19, 2000

[54] ARRANGEMENT AND METHOD RELATING TO DIGITAL COMMUNICATION SYSTEMS

[75] Inventors: Anders Harder, Stockholm; Tonny Lindström, Älvsjö, both of Sweden

[73] Assignee: Telefonaktiebolaget LM Ericsson, Stockholm, Sweden

[21] Appl. No.: 08/924,610

[22] Filed: Sep. 5, 1997

Related U.S. Application Data

[63] Continuation of application No. PCT/SE96/00276, Mar. 4, 1996.

[30]    Foreign Application Priority Data

Mar. 13, 1995 [SE]    Sweden ................................. 9500874

[51] Int. Cl.⁷ ....................................................... H04J 3/04
[52] U.S. Cl. ........................... 370/535; 370/442; 370/536; 370/537
[58] Field of Search .................................... 370/400, 422, 370/427, 357, 360, 375, 498, 535, 536, 537, 538–544, 464; 320/442

[56]    References Cited

U.S. PATENT DOCUMENTS

| | | | |
|---|---|---|---|
| 4,577,312 | 3/1986 | Nash ....................................... | 370/249 |
| 4,630,261 | 12/1986 | Irvin . | |
| 4,805,165 | 2/1989 | Kawamura et al. ..................... | 370/535 |
| 4,835,770 | 5/1989 | Hayano ................................... | 370/396 |
| 5,005,170 | 4/1991 | Nelson .................................... | 370/535 |
| 5,005,171 | 4/1991 | Modisette, Jr. et al. ................. | 370/522 |
| 5,029,163 | 7/1991 | Chao et al. . | |

FOREIGN PATENT DOCUMENTS 0473 330   3/1992   European Pat. Off. .
WO93/25031 12/1993  WIPO .

OTHER PUBLICATIONS

Barry, Charles F., et al., *Network interface design for Multi–Gbit/s WDM Optical Networks*. Journal of High Speed Networks, vol. 4, pp. 61–76 (1995).

Eng, Kai Y., et al., *High–Performance Techniques For Gigabit ATM Switching and Networking*. International Conference on Communications, vol. 3, pp. 1673–1678 (May 23–26, 1993).

*Primary Examiner*—Ajit Patel
*Assistant Examiner*—Bob A. Phunkulh
*Attorney, Agent, or Firm*—Burns, Doane, Swecker & Mathis, L.L.P.

[57]            ABSTRACT

An arrangement and a method for multiplexing/demultiplexing in a digital communication system using time division multiplex. The arrangement includes a switching arrangement with a first switching device for switching data and second switching devices for multiplexing and/or demultiplexing data. One or more second switching devices are connected to the first switching device over terminal connection links including a logical interface which includes a number of time slots arranged in rows and columns. The arrangement further includes a device for providing resources on the interface of the first terminal connection link. Resources for at least two different functionalities are reserved using reservation of resources based on columns in the interface and reservation based on time slots in the interface, respectively.

20 Claims, 6 Drawing Sheets

| TS | 0 | 1 | 2 | 3 | 4 | 5 | 6 | 7 | 8 | 9 | . . . . . . . | 16 | Row |
|---|---|---|---|---|---|---|---|---|---|---|---|---|---|
| | B | B | B | | | B | | | | | | | 0 |
| | | | | | | B | | | | | | | 1 |
| | | | | | | B | | | | | | | 2 |
| | | | | | | B | | | | | | | 3 |
| | | | | | | B | | | | | | | 4 |
| | | | | | | B | | | | | | | 5 |
| | | | | | | 1 | | | | | | | 6 |
| | | | | | | 2 | | | | | | | 7 |
| | | | | | | B | | | | | | X | 8 |
| Column | 0 | 1 | 2 | 3 | 4 | 5 | 6 | 7 | 8 | 9 | 10 | 11 | |

FIG.4

|  TS | 0 | 1 | 2 | 3 | 4 | 5 | 6 | 7 | 8 | 9 | . . . . . . .287 | Row |
|---|---|---|---|---|---|---|---|---|---|---|---|---|
|  | B | B | B | B | B |   |   |   |   |   |   | 0 |
|  |   |   |   |   | B |   |   |   |   |   |   | 1 |
|  |   |   |   |   | B |   |   |   |   |   |   | 2 |
|  |   |   |   |   | B |   |   |   |   |   |   | 3 |
|  |   |   |   |   | B |   |   |   |   |   |   | 4 |
|  |   |   |   |   | B |   |   |   |   |   |   | 5 |
|  |   |   |   |   | 1 |   |   |   |   |   |   | 6 |
|  |   |   |   |   | 2 |   |   |   |   |   |   | 7 |
|  |   |   |   |   | B |   |   |   |   |   |   | 8 |

Column   0 1 2 3 4 5 . . . . . . . 283

| No. of remaining TSs: | 1 | 2 | 3 | 4 | 5 | 6 | 7 | 8 | Row |
|---|---|---|---|---|---|---|---|---|---|
| | DTS | DTS | DTS | DTS | CTS | CTS | CTS | CTS | 0 |
| | DTS | DTS | CTS | CTS | CTS | DTS | CTS | CTS | 1 |
| | DTS | CTS | DTS | DTS | CTS | CTS | DTS | CTS | 2 |
| | DTS | DTS | DTS | CTS | DTS | CTS | CTS | CTS | 3 |
| | CTS | DTS | CTS | DTS | CTS | DTS | CTS | DTS | 4 |
| | DTS | DTS | DTS | CTS | CTS | CTS | CTS | CTS | 5 |
| | DTS | DTS | CTS | CTS | DTS | DTS | DTS | CTS | 6 |
| | DTS | DTS | CTS | CTS | CTS | CTS | CTS | CTS | 7 |
| | DTS | DTS | DTS | DTS | CTS | CTS | CTS | CTS | 8 |

ARRANGEMENT AND METHOD RELATING TO DIGITAL COMMUNICATION SYSTEMS

This application is a continuation of International Application No. PCT/SE96/00276, filed Mar. 4, 1996, which designates the United States.

BACKGROUND

The present invention relates to an arrangement and a method respectively for multiplexing and/or demultiplexing of channels in a digital communication system using time division multiplex with a switching arrangement providing for switching of data and multiplexing/demultiplexing of data in which control data and switching data are sent on connection links comprising logical interfaces from which resources can be requested.

The invention also relates to a switching arrangement comprising means for controlling multiplexing and/or demultiplexing of channels. Still further the invention relates to a communication system comprising such switching arrangement(s).

It is well known in synchronous communication systems to use arrangements for multiplexing and/or demultiplexing which means concentrating information on a number of communication channels on to one communication channel and deconcentrating information on one communication channel on to a plurality of communication channels respectively.

U.S. Pat. No. 4,630,261 shows a signal concentrator (multiplexer) comprising a buffer for storing messages and signalling information on a priority basis. In this arrangement signalling information is assigned the highest priority whereas generated voice packets are given a lower priority which in turn depends on whether the voice packets are newly generated or not. Furthermore low speed voice band data is given another priority and digital data packets still another priority. Entries in the buffer are contained in a look-up table indicating priority levels, identification, location in the buffer etc. Another table comprises the time recordings on when messages from a particular speech source exit the buffer. Via a controller running a priority algorithm the contents of the tables and the sequence entries from the buffer are used on a priority basis for forwarding to the communication channels. The entries having the highest priority are transmitted according to the first-in-first-out principle and they are then followed by the entries having lower priorities.

Via the priority algorithm is thus data shifted out on to a common communication channel.

WO 93/25031 relates to monitoring of the fill rate of an elastic buffer memory in a synchronous digital communication system. The object with the invention disclosed therein was to enable the monitoring of the fill rate of the channels using less hardware than in known systems. This is basically achieved by using a time division architecture for monitoring the fill rate so that the fill rate of two or more channels on the same hierarchical level is monitored on a time division basis in a monitoring unit which is common to the channels.

However, none of the cited documents discloses an arrangement for multiplexing and/or demultiplexing in a digital communication system which in an efficient way uses the resources on the channels. Furthermore it is difficult to connect transmission systems in such a way that the resources are efficiently used. Moreover only transmission systems for which the arrangements are particularly designed can be connected thereto.

SUMMARY

It is an object of the present invention to provide an arrangement and a method respectively for providing optimal multiplexing and/or demultiplexing of channels in a digital communication system. It is also an object of the invention to provide an arrangement comprising multiplexing and/or demultiplexing in a digital switching arrangement through which the resources, i.e. the time slots can be used as efficiently as possible.

Still further it is an object of the present invention to provide an arrangement for multiplexing and/or demultiplexing in a digital switching arrangement so that different frame-based transmission systems, particularly also other than 2 Mbit/s or 1.5 Mbit/s transmission systems can be connected thereto, particularly using the resources in a most efficient way.

It is also an object of the present invention to provide a switching arrangement comprising means for controlling multiplexing and/or demultiplexing so that the channels or time slots can be used in an efficient way. Another object of the invention is particularly to provide a switching arrangement with a multiplexing/demultiplexing controlling means such that one or more transmission systems can be connected thereto under an optimal use of the resources and even more particularly such that it is not designed merely for just a limited number of given transmission systems, but that various frame-based transmission systems can be connected thereto thus providing a great flexibility.

Another object of the invention is to provide a communication system comprising such switching arrangement(s).

These as well as other objects are achieved through an arrangement and a method respectively wherein the first switching means for switching of data is connected to a number of second switching means for multiplexing and/or demultiplexing of data via first terminal connection links. The first terminal connection links comprise a first interface. An interface comprises a number of time slots arranged in rows and columns. Connections relating to the second switching means are provided by second terminal connection links which may comprise first and/or second interfaces. Means are provided for providing resources on the first interface on the first terminal connection link. Resources for (at least) a first functionality are reserved using reservation of resources based on columns in the interface, for a second functionality the reservation of resources is based on time slot reservation.

The objects are also achieved through a switching arrangement comprising multiplexing and/or demultiplexing controlling means which provides for providing resources based on their functionality, i.e. the purpose for which they are intended, wherein for a first functionality reservation is done based on columns into which the time slots of the interface connecting to the first switching means are divided and for the second functionality, reservation is based on time slots.

An interface comprises a given number of time slots per frame (and possibly a rest of a number of bits) for a given number of bits per time slot in the interface. The interface is further divided into a given number of columns and rows of time slots plus eventually a number of extra time slots.

Generally there are three different kinds of time slots namely so called basic time slots (BTS), control time slots (CTS) and data time slots (DTS). The basic time slots are mainly used for frame control purposes and their positions within a frame are fixed. Control time slots are used for control data packets and data time slots are used for switching data. In order to understand and transfer information over the terminal connection links, the concept of logical interfaces is used. These are subjected to mapping and allocation. Allocation means defining of a time slot on an interface either as a data time slot or as a control time slot and mapping means connecting one data time slot in one interface with a data time slot in another interface. The means for providing resources in the terminal connection links, i.e. for controlling the multiplexing and/or demultiplexing comprises mapping and allocation functionality which, as referred to above, provides for (at least) a first and a second reservation depending on the functionality of the required resources.

BRIEF DESCRIPTION OF THE DRAWINGS

The invention will in the following be further described in a non-limiting way under reference to the accompanying drawings in which.

DETAILED DESCRIPTION

Figure 1:
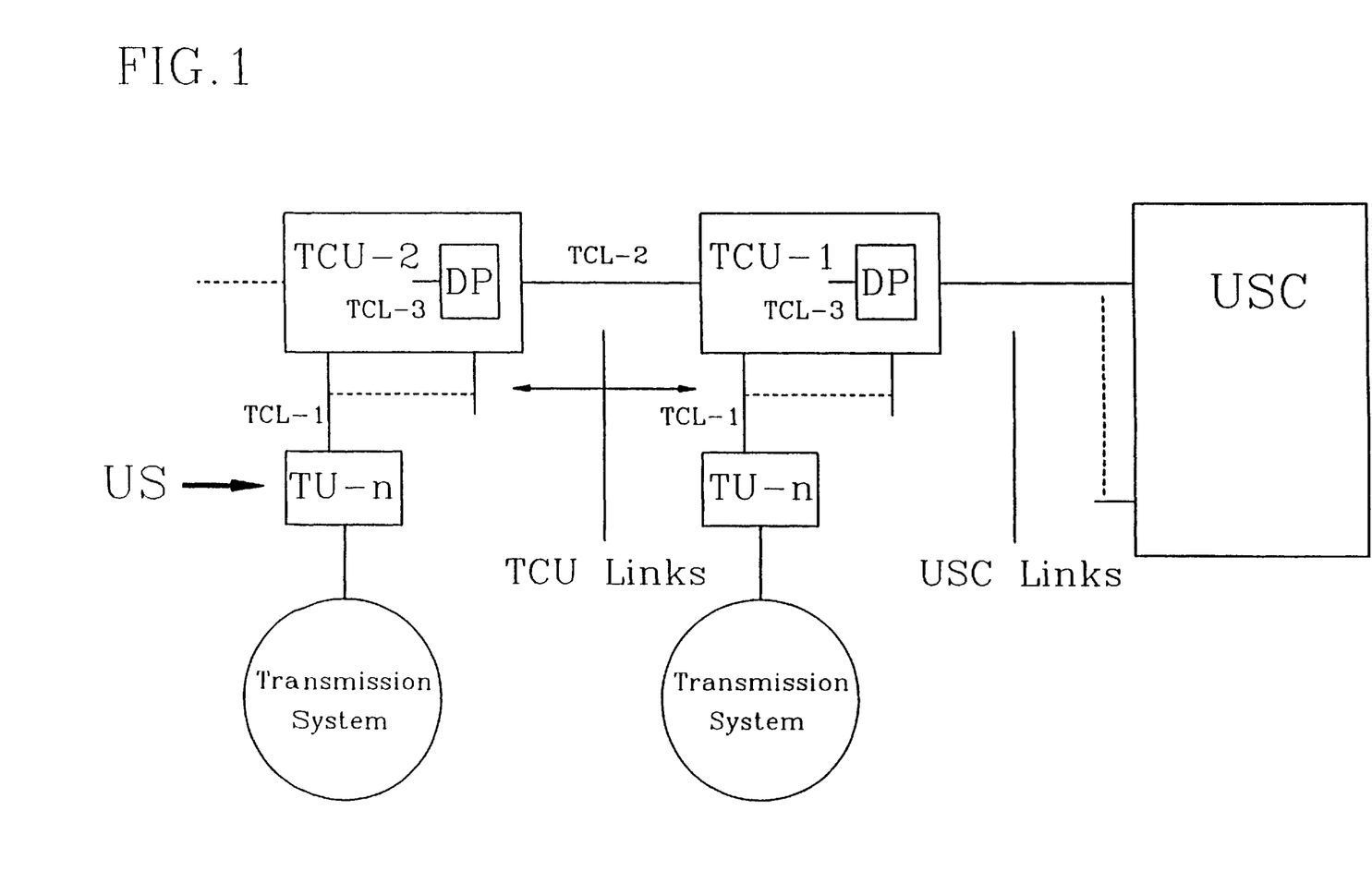
FIG. 1 schematically illustrates terminal connection links connecting a number of second switching means with a first switching means, FIG. 2 schematically illustrates connection of an arbitrary transmission system directly to a terminal connection unit.
Figure 2:
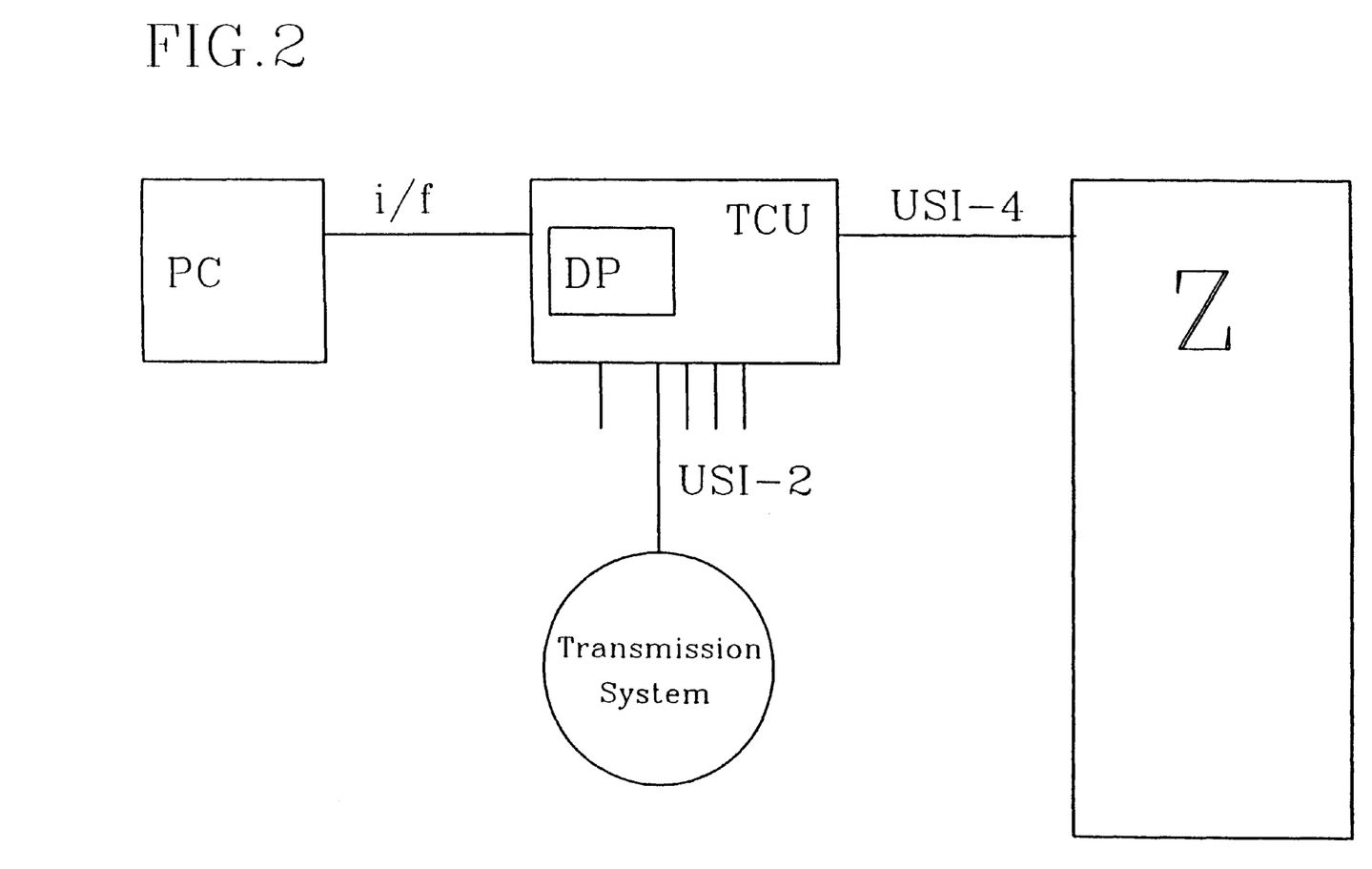

The invention will now be described under reference to a particular embodiment in which the switching arrangement comprises a switch US which in principle can be said to comprise two switching means. The first switching means USC in this embodiment is responsible for the data switching. The second switching means comprises a circuit with a number of terminal connection units TCU and provides for multiplexing and/or demultiplexing of data. The switching arrangement comprises a switch control Packet Network (USC PN) used for control, operation and maintenance functions and the circuit responsible for the switching data. In FIG. 1 is illustrated how second switching means comprising two terminal connection units TCU-1, TCU-2 are connected in cascade. The first terminal connection unit TCU-1 is connected to the first switching means USC which can be said to form a switching core over a first terminal connection link USC-link. The terminal connection units TCU-1, TCU-2 are interconnected by a second terminal connection link TCU-link, here TCL-2. As can be seen from the figure, a number of terminal units TU (n indicating any relevant number) are connected to each terminal connection unit TCU-1, TCU-2. For the connection of terminal units TU to the terminal connection units TCU also second terminal connection links TCU-links are used here denoted TCL-1. The terminal connection units TCU-1, TCU-2 communicate with device processors DP. For the communication with the device processors DP internal second terminal connection links TCL-3 are used. These are in the shown embodiment exclusively dedicated for device processor connection. As merely schematically indicated in FIG. 1 a number of terminal connection units can be connected to the first switching means or the switch core according to this embodiment. It is also possible within the invention that terminal units TU are connected directly to the switch core USC but this is not illustrated in the figure. To the first terminal connection unit TCU-1 which connects to the switch core USC a number of further terminal connection units can be connected which in turn can be connected via second terminal connection links TCL-2 to other terminal connection units in cascade as explained above. Furthermore (not shown in the figure) to each terminal connection unit TCU may a number of terminal units TU be connected via TCL-1 as also referred to above. Each terminal connection unit TCU can in turn communicate over the internal TCU links (TCL-3) with one or more device processors DP. If for example redundancy is applied there is more than one Device Processor in a TCU. To the terminal units TU transmission systems can be connected. As schematically illustrated in FIG. 2 those may in an alternative embodiment also be directly connected to the terminal connection units. The connection of the transmission systems will be further described later on. A terminal unit TU may also comprise a device processor DP (not shown).

Each terminal connection link TCU-, USC-link comprises an interface or a logical interface. Through them, the understanding and transfer of information over the terminal connection links is enabled. The first terminal connection link USC-link connects to the first switching means, i.e. in this case the switch core USC and comprises an interface and the second terminal connection links TCU comprise in the embodiment to be further discussed herein at least one interface which may be different or not from said first interface depending on which are the terminal connection unit links TCU-link (TCL-1, TCL-2 or TCL-3).

In the following an embodiment will be discussed which comprises two particular interfaces. These are however merely given for illustrative purposes and a number of other alternatives are of course also possible.

FIG. 2 illustrates an embodiment wherein a transmission system is connected directly to a terminal connection unit TCU. The TCU must then be able to find out (e.g. via reading) how the transmission system allocates its time slots in the interface. Z here denotes a switch or similar. It could in a particular embodiment also be a TCU thus providing a straight connection.

Figure 3:
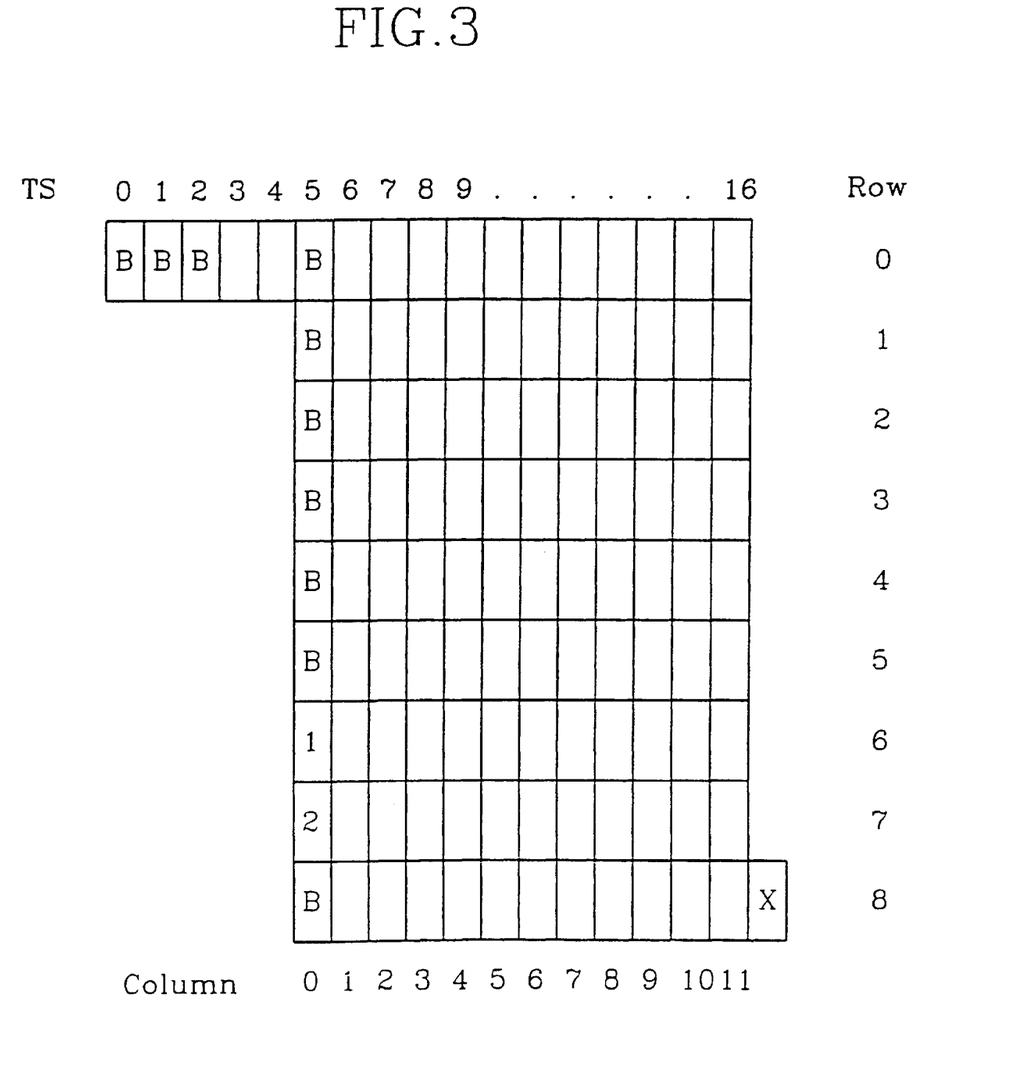
FIG. 3 illustrates a frame of the second interface.
Figure 4:
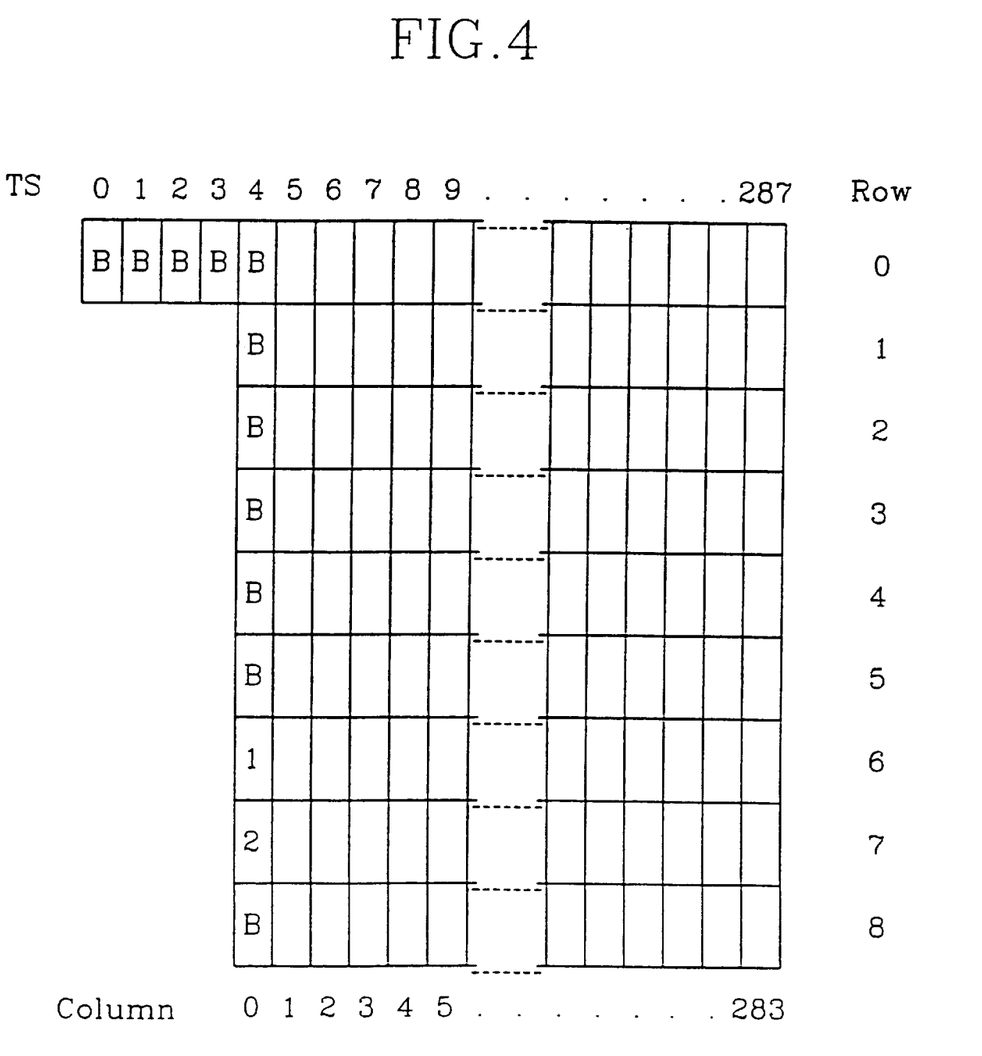
FIG. 4 illustrates a frame of the first interface.

The two interfaces which will be described, will hereinafter be referred to as USI 2 and USI 4 (the second and the first interface) respectively. The USI 2 interface (the second interface) is an 8.192 Mb/s interface comprising 113 times slots TS per frame and a remainder of seven bits. USI 4 is an 184.32 Mb/s interface with 2560 times slots per frame. In both interfaces there are 9 bits per time slot. The frames of both interfaces are further divided into rows and columns. The USI 2 interface has 12 columns and 9 rows of time slots plus 5 extra time slots and the USI 4 interface has 284 columns and 9 rows of time slots plus 4 extra time slots. A frame of the USI 2 interface and the USI 4 interface is illustrated in FIGS. 3 and 4 respectively. The time slots TS are divided into three different kinds of time slots, namely basic time slots BTS, control time slots CTS and data time slots DTS. The basic time slots BTS are mainly used for frame controlling purposes and they are fixedly arranged within the frame, i.e. they have been given fixed positions within the frame. The control time slots CTS are used for control packets and data time slots are used for switching data. In the shown embodiment a terminal connection unit TCU is equipped with one or more device processors DP as will be further discussed later on. The communication channels to a device processor DP comprise a device processor interface DPI which in turn comprises a device processor data interface DPDI and a device processor control interface DPCI.

DPDI comprises two channels DPD and D64 (Data 64 kbit). Through DPCI a device processor can receive information over the USC PN Control packet network. The transmission is done via control time slots CTS and to the device processor via DPCI. A device processor can also communicate the switching data network, the transmission is then provided via data-time slots DTS. That information is introduced via the DPDI either to DPD or D64. The DPD and D64 comprise fixed channels in the interface. The DPD channel is always mapped into the DTSB2 time slot and the D64 channel is mapped into the DTSB2 time slot.

In FIGS. 3 and 4 respectively a frame of each of the USI 2 and USI 4 interfaces is shown. In the figures basic time slots are denoted B. The fields (time slots) with no denotation, i.e. the empty fields, indicate that the time slots are allocatable as either data time slots DTS or control time slots CTS. The remainder of 7 bits in FIG. 3 is denoted X. A DPD is allocated in DTSB1(1) and D64 in DTSB2(2) as referred to above.

The hardware circuit determining the allocation of time slots in the interfaces USI is denoted an allocation store AS. The allocation stores can be accessed by terminals for allocation set up and they can be accessed from the central processor software via USC PN, the control packet network.

Figure 5:
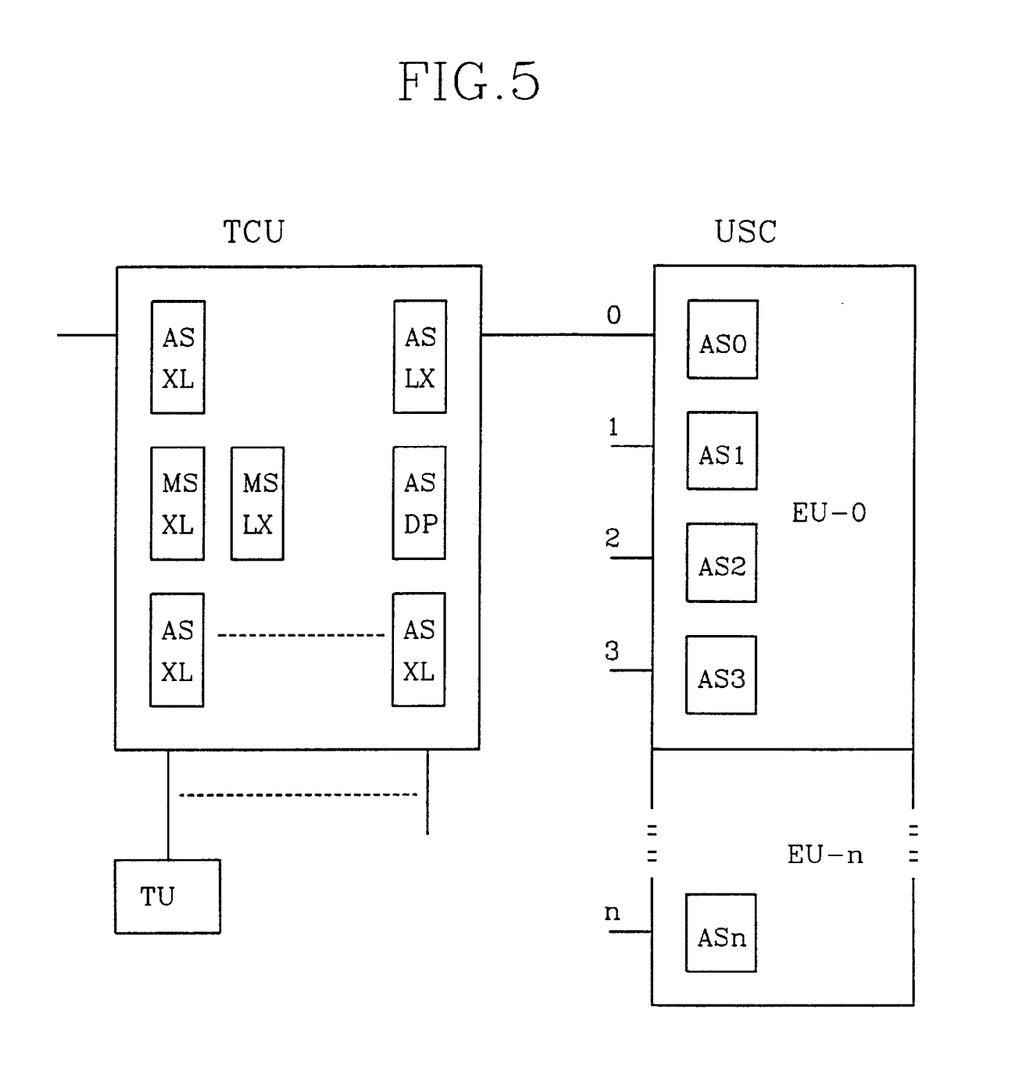
FIG. 5 illustrates the location of allocation stores and map stores in the first and the second switching means and FIG. 6 illustrates allocation of control time slots.

Allocation and mapping will now be explained under reference to FIG. 5. Allocation relates to the defining of a time slot in an interface as a data time slot DTS or a control time slot CTS. The allocation store AS is used for the definition of the time slot in the sending direction. In the receiving direction data time slots and control time slots are distinguished by the line coding, each time slot is coded either as a data time slot or as a control time slot. Allocation stores AS0, AS1, AS2, AS3, . . . , ASn are located in the first switching means, or in the present embodiment in the switch core USC. Further allocation stores AS are located in the terminal connection unit TCU so that there is one allocation store AS for each TCU link. In the switch core USC there is one allocation store for each USC link.

How the time slots in the interface USI are allocated depend on the category of the respective TCU link. The allocation of the time slots in the interface on the TCU links which are used for device processor communication are hard coded in the hardware and the allocation can not be changed by the central processor software. The allocation of the time slots of the interface on the TCU links which are used for connections to the terminal units TU are hardcoded per terminal unit variant. Generally there is a frame delay between an incoming and an outgoing frame. This means that an outgoing frame (USI4) on the USC-link is delayed in relation to an incoming frame (USI2) on the TCU link. The same applies for transmission in the other direction, i.e. the outgoing frame (USI2) on the TCU-link is delayed in relation to the incoming frame (USI4) on the USC-link. Generally the mapping algorithm (which will be more thoroughly described below) will be more flexible the longer the frame delay.

A terminal unit TU which terminates a transmission system and which is connected to a TCU via a TCU-link must allocate data time slots DTS in USI2, one DTS for each traffic channel in the transmission system. If the terminal unit TU comprises a device processor DP (discussed above) also DTSB1 and/or DTSB2 must be allocated. The allocation of DTS can be done in different ways, but the DTSs should be spread as evenly as possible over the USI2 frame. The allocation information is held by switch terminating units which are not further discussed herein. The corresponding TCU allocation store has to be loaded with the same allocation and the CP-software of the TCU must ask the CP software of the terminal unit TU about the particular allocation in order to be able to load the allocation store AS. The CP software of the terminal connection unit TCU determines the allocation of the time slots in the interface on the USC link and the TCU link which is used for cascade connections.

The allocation is identical in both directions, i.e. to the switch core USC and from the switch core USC respectively.

The hardware circuit which determines the mapping of the time slots of the interface is here referred to as a mapping store MS. The mapping stores are accessed by terminals for mapping setup. These terminals are accessible from the CP software. With mapping is here understood the connection of a data time slot DTS in one interface with a data time slot DTS in another interface. Mapping stores are located in the terminal connection unit, here two mapping stores per terminal connection unit of which one is intended for the switch to link direction XL and the other is intended for link to switch direction LX. The mapping is the same in both directions (as well as the allocation), i.e. the two mapping stores MS store the same information. The mapping is controlled by the CP software of the terminal connection unit TCU. All times slots which are not mapped are here allocated as control time slots CTS. In FIG. 3 is merely indicated the fact that a number of terminal connection units TCU can be connected to the switch core USC which may comprise one or more extension units EU-0, . . . , EU-n. In each extension unit there is a given number of allocation stores, for example in the first extension unit EU-0 there are four allocation stores, AS0, AS1, AS2 and AS3. In the figure it is also indicated that a number of terminal units TU can be connected to each terminal connection unit TCU.

The first and second switching means will in following be more thoroughly discussed. The first switching means, in the shown embodiment denoted the switch core USC performs the actual time- and space switch operations on the streams of data. The switch core USC is equipped with a number of allocation stores AS, one for each USC inlet as discussed above. The allocations stores AS are in the shown embodiment designed for the USI 4 interface as discussed in the forgoing. They are owned by USC CP-software which however needs to fetch the allocation information from the TCU CP-software in the allocation store AS-LX in the TCU that determines the allocation of the interface USI 4 on the USC link. The switch core USC comprises a device processor and an equipment processor (not shown) which are accessible from the interface USI 4. There may be more of each if redundancy is applied; this is also generally applicable to the device processors within TCU. The communication with these device processors and equipment processors requires time slots on the USC link and two basic time slots in the first USC links are reserved therefore. There is a hardware reservation which cannot be changed from the CP software. The device processor(s) is mainly used for maintenance of the switch core USC whereas the equipment processor(s) is used for synchronisation of the switching arrangement.

The terminal connection unit TCU has as its main function to multiplex and/or multiplex data streams between terminal units (to be further described below) and the switch core USC. The multiplexing and/or demultiplexing is controlled by the mapping and allocation function, also referred to as means provided for providing resources or controlling means. The function as such is mainly implemented in the CP software of the terminal connection unit TCU.

The terminal connection unit TCU has one inlet for connection of the TCU to the prevoius unit in the core direction unless, of course, it is the first terminal connection unit which is directly connected to the switch core USC. This inlet however, is designed for the first terminal connection link USI 4. The number of terminal connection unit link inlets depend on the kind of terminal connection unit in question, i.e. the TCU variant. The TCU-link inlets which are used for cascade connection are designed for the first interface USI 4 whereas TCU link inlets which are used for connections to terminal units TU are designed for the first and/or the second interface, i.e. for USI 4 and/or USI 2. TCU link inlets which are used for device processor communication are in the shown embodiment only designed for the second interface USI 2. Each inlet comprises an allocation store AS which determines the allocation of time slots in the sending direction.

A terminal connection unit TCU is equipped with one device processor (or more if redundancy), see FIG. 1. The device processors DP are connected internally in the TCU via the USI 2 interface. A device processor in a TCU uses only the DPD channel (as discussed earlier in the present document) and it is mapped into the DTSB1. For each device processor a reservation is needed. This reservation is according to the illustrated embodiment done on a time slot basis which will be further explained below. Data time slots which are received on TCU links are terminated in two first in first out memories (FIFO) in the terminal connection unit. One of the FIFO memories is used for traffic time slots and another FIFO memory is used for DTSB:s. DTSBs are dedicated for units equipped with one or more device processors as discussed above. However, still a further FIFO memory is used for the control time slots of the control packet network.

Data is inserted to and/or removed from a switching arrangement via a terminal unit TU. The switching arrangement forms switching structure comprising the first and second switching means USC and $TCU_{j, i,1, \ldots, n}$ and the terminal units. It terminates in a switch terminating unit (not illustrated) taking two different forms of which one supports USI 2 and the other supports the USI 4. A terminal unit can also comprises a mapping and allocation unit. The allocation of time slots in the interface between the terminal unit and the switching arrangement is given by the switch terminating unit circuit. If an external interface transmission system is connected to the terminal unit, the terminal unit also needs to map external time slots into the interface (USI2). Seen from the mapping and allocation function, the terminal unit mapping and allocation forms a constant i.e. it is hardcoded as was mentioned earlier. The mapping and allocation function needs to be informed about this allocation in order to be able to load allocation stores AS and mapping stores MS in the terminal connection unit TCU. The terminal unit may ask for data time slots DTS both via column based reservation and time slot based reservation. Column based reservation and time slot based reservation will be explained below.

There is one switch store (not shown) per USC link. Therefore consecutive TSs from the USC link are stored in consecutive positions within the switch store. The position numbering of the time slots starts from first USC link of Extension Unit 0 (EU-0).

As USI 4 is used on the USC link, the switch store is able to store 2560 TSs. Each switch store position corresponds to a multiple position. It means that the first link on EU-0 "owns" multiple position 0 to 2559, the second link "owns" multiple position 2560 to 5119 and so on.

As soon as the mapping and allocation of time slots on the USC link is permformed for a user, it is known which positions that are assigned to that particular user.

Below the mapping and allocation algorithm of the switching arrangement will be further discussed. Mapping and allocating in the switch in principle comprises three subfunctions, namely reservation of, loading and releasing mapping and allocation data. Mapping and allocation data loading is executed when a unit is taken into operation. The mapping and allocation data is then loaded into the affected mapping stores and allocations stores. Mapping and allocation data release is executed when a unit is disconnecting. Mapping and allocation data is released and the concerned mapping stores and allocation stores are reloaded. The loading and release functions will not be further described herein since what is relevant for the present invention is mapping and allocation data reservation which comprises an algorithm which is executed in a mapping and allocation data reservation subfunction when the unit requests resources for a transmission system and/or resources for a device processor. The algorithm is active in building up mapping and allocation data which later will be loaded into the mapping stores and allocation stores.

The mapping and allocation data reservation function according to the invention provides two algorithms for requesting resources on the terminal connection links, namely column based reservation and time slot based reservation. Column based reservation is used for traffic channels whereas time slot based reservation is used for device processor channels.

When a unit (e.g. a terminal unit TU) does a column based request for data time slots, the whole column is reserved for that particular unit. The number of reserved columns depends on the number of data time slots that are requested. When on the other hand a unit does a time slot based request for data time slots, time slots in an idle or, if possible, in a column, reserved for time slot used reservation, are reserved. The data time slots within this column may either belong to one unit or to a number of different units.

In the following column based reservation will be further explained. Column based reservation is used for reservation of data time slots for e.g. a transmission system. It is according to the present invention possible to handle arbitrary transmission systems which may vary e.g. from 1 up to 2547 64 Kb/s channels. The invention applies to systems with 64 Kb/s channels. In principle, however, it is also applicable to other transmission systems on condition that a number of requirements are fulfilled, e.g. that the frames are synchronized, are the same in time etc.

In the particular embodiment described herein, the USI4 interface is used on the USC link. The frame of this interface comprises 9 allocatable time slots within a column and there are 283 reservable columns. For column based reservation the USI4 frame is divided into areas. Through dividing the number of requested data time slots DTS by 9, i.e. the number of allocatable time slots within a column, the number of areas is given. The number of reservable columns in the interface, i.e. here 283, is divided by the needed number of areas thus giving the number of columns within the areas. The remaining columns are then grouped together at the end of the frame forming a rest area. For the unit making the request, one column in each area will be reserved unless the request is to be rejected as will be explained below.

An example will now be given according to which a 2 Mbit/s transmission system with 32 channels is connected to a terminal unit. Since there are 32 time slots, these will be divided by 9 which gives 3.55 areas. This figure will be rounded up, thus giving 4 areas.

In order to establish the number of columns per area, the 283 columns will be divided by the 4 areas which gives 70.75 columns per area. This figure will be rounded down thus giving 70 columns per area and a rest area of 3 columns, here the last columns number 283,282 and 281. This figure also gives that, maximally, 70 2 Mb/s transmission systems can be connected to the USC link.

The algorithm then starts with a search for the first free column in the first area whereafter a jump of 70 columns is done in order to find the corresponding column in the second area and so on for columns 3 and 4 etc. If the corresponding column is occupied in area 2,3 or 4, the procedure is restarted. This means that the next free column in the first area, area 1, is selected. The procedure is restarted since it is an ambition to have the columns equidistantly located and to create a structure of reserved columns which makes alternative and/or future reservations of columns optimal. The columns are advantageously equidistant for the performing of column switching. If it is not possible to require equidistant columns, the first free column in each area is reserved which is referred to as shifted columns. If it is not possible to reserve so called shifted columns either, the request will here be rejected.

Figure 6:
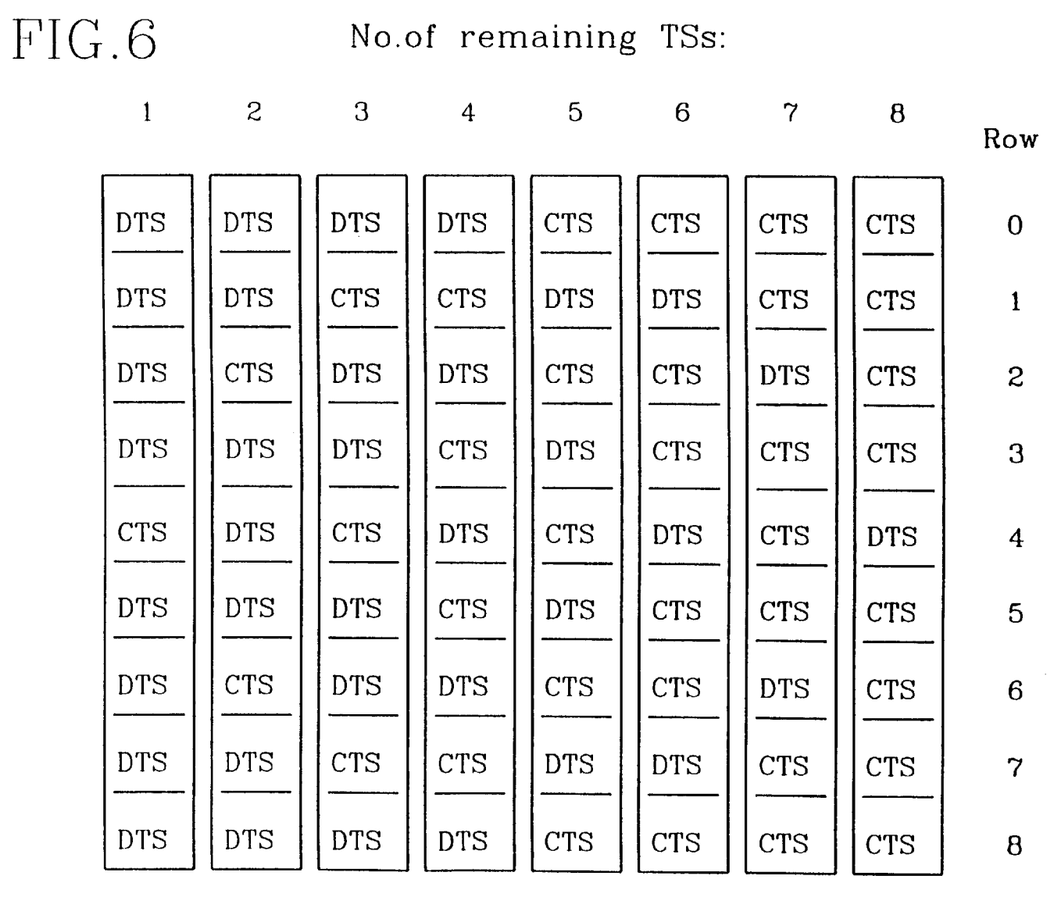

If the number data time slots that is requested is not a multiple of 9 (in this case), a number of time slots will remain. These will be allocated as control time slots as referred to above. For the 2 Mb/s transmission system there will be 4 time slots allocated as control time slots since 4 columns×9 time slots is equal to 36 time slots and 36 time slots minus 32 time slots is equal to 4 time slots. Then these control time slots CTS are allocated in the reserved column of the last area as can be seen from FIG. 6. The control time slots CTS are allocated in this manner with the purpose of eliminating the risk of underflow or overflow in the FIFO memories of the terminal connection unit. Among others column reservation provides an advantageous reservation method e.g. upon loading of mapping and allocation data into the stores and when a user wants to switch a complete column.

Time slot based reservation will now be further explained. Time slot based reservation is here used for device processor channels or DP-channels which comprise communication channels to a device processor. The device processor interface DPI comprises a device processor data interface DPDI and a device processor control interface DPCI. The device processor data interface DPDI supplies two device processor channels DPD and D64 as referred to earlier. A unit can use either one of the channels or both of them. The DPD channel is mapped into the DTSB1 time slot in a USI frame and the D64 channel is mapped into the DTSB2 time slot. If a DTSB is not used, it will be allocated as a control time slot CTS.

The time slot based reservation starts from the last column, in the herein described embodiment from column number 283. Since 283 is a prime number, column 283 will never be reserved for traffic channels with the exception of a case in which either one or 283 columns must be reserved. The number of columns that will be used for traffic channels depends on the particular connected transmission system or systems. In the case of the 2 Mbit/s transmission system, three columns, namely columns number 283, 282 and 281 will never be used for column based reservation. The time slot based reservation algorithm can be said to form a compromise of using the rest area, i.e. the remaining columns, to spread the columns evenly over the frame of the interface, to minimize the effects for the column based reservation and to take into account that different types of transmission systems can be connected to one and the same USC link.

The time slot based reservation algorithm starts by checking if any columns are reserved on a time slot basis. If there are no columns reserved on a time slot basis, column 283 is selected and the requested number of time slots are allocated as data time slots. If on the other hand columns have been reserved on a time slot basis, these columns are checked and if there are sufficiently free time slots in any of the columns, these are reserved and allocated as data time slots.

If however there is not a sufficient number of free time slots, a new column has to be reserved. The rest area for the last connected transmission system is checked and the first free column is selected and the requested number of time slots are allocated as data time slots DTS.

If however none of the columns in the rest area is free, a calculation based on the requested number of time slots for the last connected transmission system has to be done. This calculation substantially corresponds to the calculation done for column based reservation as discussed above. The number of requested time slots are thus divided by 9 which gives a number of areas and the number of columns is divided by the number of areas thus giving the number of columns per area. According to the time slot based reservation the last column in the last area is checked first. If this column is occupied, the corresponding column in the second last area is checked etc. until a free column is found or all areas have been checked. If all areas have been checked, the algorithm starts again from the second last column in the last area and repeats the described procedure until a free column is found etc. If no free column can be found, the request is rejected.

According to the invention the resources in the interface on the link connecting to the switch core can be used optimally for one or more transmission systems. Today there are only 32 and 24 channel systems (2 Mbit/s and 1.5 Mbit/s) but according to the present invention it will also be possible e.g. to connect other kinds of transmission systems or future transmission systems.

What is claimed is:

1. In a digital communication system using time division multiplex (TDM) and including a switching arrangement having first switching means for switching data and second switching means for multiplexing/demultiplexing data, terminal connection links for interconnecting the switching means, control data and switching data being sent on the terminal connection links which include logical interfaces having a number of time slots arranged in rows and columns, and means for providing resources in the form of time slots, an arrangement for multiplexing/demultiplexing, comprising:

first terminal connection links for connections between a number of second switching means and the first switching means, wherein the first terminal connection links include a first interface; and second terminal connection links for connections relating to the second switching means, wherein the second terminal connection links include at least one of the first interface and a second interface;

wherein, via the resources providing means on the interface of the first terminal connection link, resources for at least two different functionalities are respectively reserved based on columns in the interface and based on time slots in the interface, wherein resources are reserved based on time slots for device processor channels, wherein if columns are reserved for time-slot-based reservation and if there is a sufficient number of free time slots therein, these time slots are reserved and allocated as data time slots.

2. The arrangement of claim 1, wherein the second switching means comprises a number of terminal connection units.

3. The arrangement of claim 2, wherein the second switching means further comprises terminal units connected to the terminal connection units.

4. The arrangement of claim 2, wherein the first switching means comprises a switch core.

5. The arrangement of claim 1, wherein the second terminal connection links comprise at least one terminal connection link for connections between terminal units and second switching means, terminal connection link for interconnecting second switching means in cascade, and terminal connection link internal to the second switching means for communication with device processors.

6. The arrangement of claim 1, wherein a number of transmission systems are connected to terminal connection units either directly or indirectly via terminal units connected to the terminal connection units.

7. The arrangement of claim 1, wherein resources are reserved based on columns for a first functionality that relates to reserving time slots for traffic channels.

8. The arrangement of claim 1, wherein resources are reserved based on time slots for device processor channels thus relating to a second functionality.

9. The arrangement according to claim 1, wherein a number of time slots are basic time slots that have fixedly arranged positions within frames of the interfaces and that are mainly used for frame control.

10. The arrangement of claim 1, wherein data time slots requested by a terminal unit for a transmission system connected thereto are reserved based on columns.

11. The arrangement of claim 1, wherein a terminal unit comprises a device processor and resources requested by the terminal unit are reserved based on time slots.

12. The arrangement of claim 1, wherein the first interface of the first terminal connection link is used for reserving resources based on columns; the frames of the first interface are divided into areas by dividing a number of requested data time slots by a number of allocatable time slots within a column in order to find a number of areas needed; a number of columns that can be reserved in the interface is divided by the needed number of areas to give the number of columns within an area; and one column in each area is reserved for the terminal unit or for an arrangement in a transmission system directly connected to a terminal connection unit.

13. The arrangement of claim 12, wherein the first interface on the first terminal connection link has nine time slots within a column that are allocatable, and the number of columns that can be reserved is 283.

14. The arrangement of claim 12, wherein the allocating means finds equidistant columns in each area.

15. The arrangement of claim 14, wherein if it is not possible to reserve equidistant columns, the first free column in each area is reserved.

16. The arrangement of claim 15, wherein a request for resources is rejected if it is not possible either to reserve equidistant columns or to reserve shifted columns.

17. The arrangement of claim 12, wherein if a requested number of data time slots is not a multiple of the number of allocatable time slots within a column, the remaining time slots are allocated as control time slots according to a predetermined scheme.

18. In a digital communication system using time division multiplex (TDM) and including a switching arrangement having first switching means for switching data and second switching means for multiplexing/demultiplexing data, terminal connection links for interconnecting the switching means, control data and switching data being sent on the terminal connection links which include logical interfaces having a number of time slots arranged in rows and columns, and means for providing resources in the form of time slots, an arrangement for multiplexing/demultiplexing, comprising:

first terminal connection links for connections between a number of second switching means and the first switching means, wherein the first terminal connection links include a first interface; and second terminal connection links for connections relating to the second switching means, wherein the second terminal connection links include at least one of the first interface and a second interface;

wherein, via the resources providing means on the interface of the first terminal connection link, resources for at least two different functionalities are respectively reserved based on columns in the interface and based on time slots in the interface, wherein resources are reserved based on time slots for device processor channels, wherein for reservation based on time slots, reservation starts from a last column of the columns into which the frames of the first interface of the first terminal connection link are divided, and if no columns are reserved for time-slot-based reservation, the last column is selected and the requested number of time slots are allocated as data time slots.

19. In a digital communication system using time division multiplex (TDM) and including a switching arrangement having first switching means for switching data and second switching means for multiplexing/demultiplexing data, terminal connection links for interconnecting the switching means, control data and switching data being sent on the terminal connection links which include logical interfaces having a number of time slots arranged in rows and columns, and means for providing resources in the form of time slots, an arrangement for multiplexing/demultiplexing, comprising:

first terminal connection links for connections between a number of second switching means and the first switching means, wherein the first terminal connection links include a first interface; and second terminal connection links for connections relating to the second switching means, wherein the second terminal connection links include at least one of the first interface and a second interface;

wherein, via the resources providing means on the interface of the first terminal connection link, resources for at least two different functionalities are respectively reserved based on columns in the interface and based on time slots in the interface, wherein resources are reserved based on time slots for device processor channels, wherein if columns are reserved for time-slot-based reservation and if there are not sufficient idle time slots in any of these columns, a rest area of a last-connected transmission system is examined and the first idle column is selected.

20. In a digital communication system using time division multiplex (TDM) and including a switching arrangement having first switching means for switching data and second switching means for multiplexing/demultiplexing data, terminal connection links for interconnecting the switching means, control data and switching data being sent on the terminal connection links which include logical interfaces having a number of time slots arranged in rows and columns, and means for providing resources in the form of time slots, an arrangement for multiplexing/demultiplexing, comprising:

first terminal connection links for connections between a number of second switching means and the first switching means, wherein the first terminal connection links include a first interface; and second terminal connection links for connections relating to the second switching means, wherein the second terminal connection links include at least one of the first interface and a second interface;

wherein, via the resources providing means on the interface of the first terminal connection link, resources for at least two different functionalities are respectively reserved based on columns in the interface and based on time slots in the interface, wherein resources are reserved based on time slots for device processor channels, wherein if none of the columns not reserved by column-based reservation contains a sufficient number of free time slots, the allocating means finds the number of columns per area, where after, starting from the last column of the last area, corresponding columns in each area are checked in a reverse consecutive way until a free column is found.

* * * * *